United States Patent
Hörmann

(10) Patent No.: US 6,640,494 B2
(45) Date of Patent: Nov. 4, 2003

(54) DRIVE FOR CLOSING DEVICES WITH VARIABLE SPEED OUTPUT

(75) Inventor: Michael Hörmann, Halle (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 0 days.

(21) Appl. No.: 09/772,009

(22) Filed: Jan. 29, 2001

(65) Prior Publication Data

US 2001/0037600 A1 Nov. 8, 2001

(30) Foreign Application Priority Data

Jan. 28, 2000 (DE) .......................................... 100 03 630

(51) Int. Cl.$^7$ .............................................. E05F 15/20
(52) U.S. Cl. ................................ 49/31; 49/138; 49/197; 49/198; 49/199
(58) Field of Search ........................... 49/31, 197, 138, 49/198, 348, 199, 349, 350, 351; 318/268, 271

(56) References Cited

U.S. PATENT DOCUMENTS

| | | | | |
|---|---|---|---|---|
| 2,619,939 A | * | 12/1952 | Oishei et al. ................. 91/396 |
| 4,228,396 A | * | 10/1980 | Palombo et al. ............. 324/163 |
| 4,328,451 A | * | 5/1982 | Barge .......................... 318/596 |
| 4,449,082 A | * | 5/1984 | Webster ....................... 318/271 |
| 5,126,642 A | * | 6/1992 | Shahrodi ..................... 318/433 |
| 5,142,824 A | * | 9/1992 | Le Compagnon et al. .... 49/349 |
| 5,349,276 A | * | 9/1994 | Mezzatesta et al. ........ 318/268 |
| 5,351,439 A | * | 10/1994 | Takeda et al. ................. 49/28 |
| 5,353,859 A | * | 10/1994 | Oltahfer et al. ............. 160/310 |
| 5,552,685 A | * | 9/1996 | Young et al. ................ 318/254 |
| 5,606,826 A | * | 3/1997 | Calhooun ..................... 49/138 |
| 5,780,984 A | * | 7/1998 | Miyako et al. .............. 318/268 |
| 5,929,580 A | * | 7/1999 | Mullet et al. ................ 318/466 |
| 5,977,732 A | * | 11/1999 | Matsumoto .................. 318/283 |
| 6,082,433 A | * | 7/2000 | Vafaie et al. ................ 160/310 |
| 6,161,438 A | * | 12/2000 | Mullet et al. ................... 73/774 |
| 6,208,102 B1 | * | 3/2001 | Kikuchi et al. .............. 318/466 |
| 6,215,265 B1 | * | 4/2001 | Wolfer et al. ................ 318/434 |
| 6,326,751 B1 | * | 12/2001 | Mullet et al. ................ 318/434 |
| 6,388,412 B1 | * | 5/2002 | Reed et al. .................. 318/466 |
| 6,477,454 B1 | * | 11/2002 | Rogovin ....................... 701/36 |
| 6,484,784 B1 | * | 11/2002 | Weik et al. ..................... 160/7 |

* cited by examiner

Primary Examiner—Gregory J. Strimbu
(74) Attorney, Agent, or Firm—Dilworth & Barrese, LLP.

(57) ABSTRACT

A drive system for closing devices, for example gates or shutters, with a variable speed output drive and a device for detecting a given characteristic of the drive, and is varied to maintain a substantially constant speed of the closing device as it moves between the open position and the closed position.

7 Claims, 1 Drawing Sheet

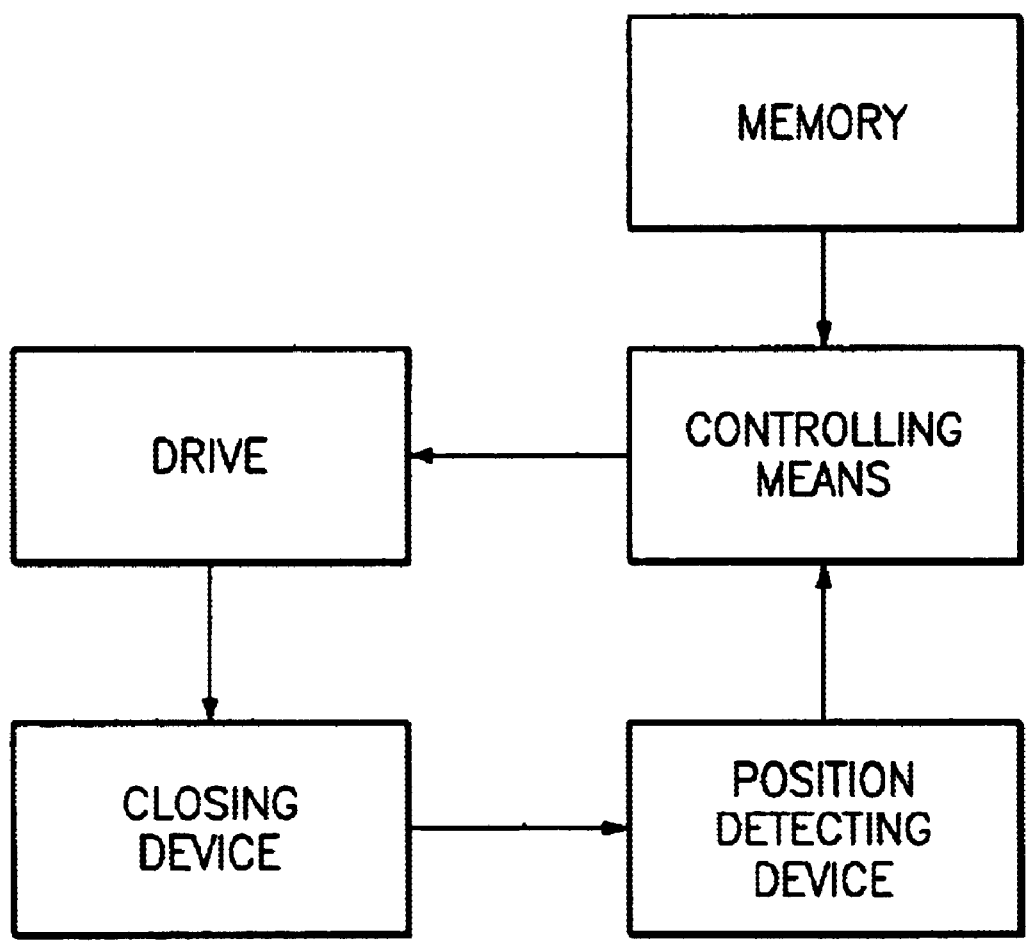

DRIVE FOR CLOSING DEVICES WITH VARIABLE SPEED OUTPUT

BACKGROUND OF THE INVENTION

The invention concerns a drive for closing devices, such as gates and shutters, with variable speed output and a device for detecting a given position of the closing.

With respect to the operating of doors and gates, the use of variable-speed drives to impart motion to doors and gates is already known. For example, garage-door drives are known in which slow opening and closing speeds are used during the starting and stopping phase. A "gentle action" in the opening and closing of garage doors is thereby achieved. Initial slow acceleration of the garage door out of rest position to final motion speed, and its slowing down with appropriate deceleration before coming to a stop, is also ensured. This prevents a sudden crash of the garage door, which can lead to locking of the door and to annoying noise.

Additionally, frequency-converter-controlled drives that propel doors rapidly into open position and slowly into closed position by means of an appropriate frequency default are used in industry.

Additionally, a non-constant opening and closing movement of a closing device—for example a gate, a door, or a shutter—is also created by the design-related mechanical quality of the closing mechanism itself. The drive moment of the drive is transferred in a number of different ways to closing devices, that is, doors, gates, shutters, etc. Industrial gates are often activated by means of shaft drives that act directly on the rolling shaft. Similarly, in rolling gates in which the gate is wrapped spirally on a rolling shaft, this rolling shaft is operated directly by the drive. In sectional gates a torsion spring shaft is usually driven by winding drums. The cables are wound on the drums. The gate hanging on the cables is operated by means of the rotation of the drums.

When the aforementioned closing devices are activated, because of different mechanical winding principles of the closing devices different gate section speeds occur, if we assume here a constant speed output of the drive. In the case of the rolling gate, these different speeds are created by the spiral-shaped winding. In the case of a constant rolling-shaft speed, the rolling gate will initially close out of its wound-up state at a higher speed than is the case shortly before complete unwound state, since during the unrolling of the rolling gate the diameter of the spiral turn diminishes and thus the circumferential speed at which the rolling gate descends quickly decreases. Conversely, when the rolling gate is rolled up it moves more slowly, with a still smaller coil diameter, than is the case just before it reaches the maximum coil diameter.

In the case of the sectional gate, the differences in the opening and closing speeds result from the fact that for reasons of adjustment of gate weight and spring differential the cable drums are not always cylindrical, they can be conical or even a combination of cylindrical and conical. Here again, variable gate section speeds are thereby created with constant speed output.

While the above-described changes in speed in the opening and closing of closing devices are desirable, and are achieved by means of variable-speed drive of the closing devices, changes in speed during opening and closing of closing devices because of design-related characteristics are not desired.

It has been recognized that for safety reasons it is desirable to try to achieve defined and unchanging gate section speeds, except during the starting and stopping phases.

This leads to the task of perfecting a drive according to the generic model in such manner that closing devices can be operated, regardless of their construction, with defined, unchanging opening and closing speeds.

SUMMARY OF THE INVENTION

According to the invention, this task is performed by a closing-device variable-speed drive according to the generic model, by means of the combination with the characteristics of the drive speed output depending upon position of the closing device, and controllable based on given mechanical closing characteristic of the closing device.

Accordingly, a drive for closing devices such as gates or shutters with variable-speed drive and a device for detecting a given position of the closing device is designed in such manner that the speed output of the drive can be controlled, depending on the position of the closing device and depending on the mechanical closing characteristic of the closing device in question. An unvarying opening and closing speed can thereby be ensured for a wide variety of types of gates, doors, or shutters. By means of the control mechanism, provision can of course also be made for slower speeds during the starting and stopping phases. However, it is essential that a constant operating speed be adjustable for most of the operating path.

Particularly advantageous embodiments of the invention result from the description herein.

BRIEF DESCRIPTION OF THE DRAWING

The present invention will be described in greater detail by reference to the accompanying drawing which schematically illustrates the cooperation between the components forming the drive of the present invention.

DESCRIPTION OF THE PREFERRED EMBODIMENT

According to the description herein, the drive control mechanism can be connected with an incremental or absolute path detector for detecting and reporting the position of the closing device.

The control mechanism can have at least one memory in which the values of the mechanical closing characteristic of at least one closing element can be stored. Depending on the position of the closing device and the reading of the actual table of values of the closing characteristic, the control mechanism can then determine the control variable for the output speed of the geared motor. If there is more than one memory, a variety of closing characteristics for a variety of closing devices can be stored in the drive. The drive can thus be used in a particularly advantage manner for a variety of closing devices. Switching-on can occur just before actuation of the closing device connected with the drive by means of programming of the memory with the values containing the characteristic of the connected closing device.

In an alternative to the aforementioned design, the drive can have, in addition to an operating mode, an intelligent mode for detecting the closing characteristic, in which, depending on the position of the closing device, the drive detects the mechanical closing characteristic by determining the torque converter course via the operating path of the closing device. This characteristic can then likewise be stored in a memory that in operating mode coordinates the given closing characteristic values of the given position of the closing device. In a rolling gate, for example, the gate characteristic resulting from the spiral roll-up, and in a sectional gate the modified torque conversion needed, can be determined based on the conical-cylindrical cable drum path, and can be stored in a memory for use in the operating mode of the gate in question.

Application of the above-described drive as a rolling-gate or sectional-gate drive is advantageous.

What is claimed is:

1. A driving system for a closing device having
   a variable speed output drive for driving the closing device between an open and a closed position along a predetermined path,
   a device that detects a position of the closing device along the predetermined path,
   means for controlling output of the variable speed output drive depending upon both the position of the closing device along the predetermined path and given mechanical closing characteristics of the drive at several points along the predetermined path of the closing device, to ensure substantially constant speed of the closing device between a start-up phase and a stopping phase along the path, wherein
   said controlling means includes an intelligent mode for determining the mechanical closure characteristics by measuring a torque of the drive for each of said several points along the predetermined path of the closing device.

2. The driving system according to claim 1, wherein said controlling means comprise at least one memory, in which values of the torque of the drive are stored.

3. The driving system of claim 2, wherein, depending upon the position of the closing device and a reading of a table of the values of the torque of the drive stored in said memory, said controlling means determine a control variable for an output speed of a geared motor constituting said drive.

4. The driving system of claim 3, comprising an additional memory having a variety of closing characteristics for a variety of closing devices stored therein.

5. The driving system according to claim 1 wherein the closing device comprises a rolling gate.

6. The driving system according to claim 1 wherein the closing device comprises a sectional gate.

7. The driving system of claim 1, wherein a slower speed the closing device is provided during the start-up phase and the stopping phase.

* * * * *